(12) United States Patent
Carlsson et al.

(10) Patent No.: US 9,383,915 B2
(45) Date of Patent: Jul. 5, 2016

(54) ZOOMING METHOD (75) Inventors: Fredrik Carlsson, Hjarup (SE); Mats Järgenstedt, Vallingby (SE)

(73) Assignee: ST-ERICSSON SA, Plan-les-Ouates (CH)

( * ) Notice: Subject to any disclaimer, the term of this patent is extended or adjusted under 35 U.S.C. 154(b) by 421 days.

(21) Appl. No.: 13/995,767

(22) PCT Filed: Feb. 23, 2012

(86) PCT No.: PCT/EP2012/053083
§ 371 (c)(1),
(2), (4) Date: Oct. 2, 2013

(87) PCT Pub. No.: WO2012/113874
PCT Pub. Date: Aug. 30, 2012

(65) Prior Publication Data
US 2014/0040821 A1  Feb. 6, 2014

Related U.S. Application Data

(60) Provisional application No. 61/472,488, filed on Apr. 6, 2011.

(30) Foreign Application Priority Data

Feb. 24, 2011  (EP) ...................................... 11155775

(51) Int. Cl.
G06F 3/048 (2013.01)
G06F 3/0488 (2013.01)
G06F 3/0484 (2013.01)

(52) U.S. Cl.
CPC .......... *G06F 3/0488* (2013.01); *G06F 3/04845* (2013.01); *G06F 3/04883* (2013.01)

(58) Field of Classification Search
None
See application file for complete search history.

(56) References Cited

U.S. PATENT DOCUMENTS

| 8,479,122 B2* | 7/2013 | Hotelling | G06F 3/0418 715/767 |
| 2009/0207142 A1* | 8/2009 | Keranen | G06F 3/04845 345/173 |
| 2009/0259964 A1* | 10/2009 | Davidson | G06F 3/0481 715/788 |

(Continued)

FOREIGN PATENT DOCUMENTS

| EP | 2 214 089 A2 | 8/2010 |
| WO | 2006/020305 A2 | 2/2006 |

(Continued)

OTHER PUBLICATIONS

International Search Report issued in corresponding International application No. PCT/EP2012/053083, date of mailing May 15, 2012.

*Primary Examiner* — Hua Lu
(74) *Attorney, Agent, or Firm* — Patent Portfolio Builders PLLC (57) ABSTRACT

A method of zooming in a graphical user interface of an electronic device (1) having a touch screen (2) for receiving input from a user via touch interactions is disclosed. The method comprises detecting a first touch event, which is the result of a first touch interaction at a first coordinate (c1) of said touch screen (2). The method further comprises detecting a second touch event, which is the result of a second touch interaction, subsequent to the first touch interaction, at a second coordinate (c2) of said touch screen (2). Furthermore, the method comprises detecting a third touch event, which is the result of a third touch interaction, subsequent to the second touch interaction, at a third coordinate (c3a, c3b) of said touch screen (2). Moreover, the method comprises controlling the touch screen to perform a zoom operation on an image displayed on the graphical user interface. The zoom operation is representative of a first distance $L_1$ between the first coordinate (c1) and the second coordinate (c2) and a second distance $L_2$ between the first coordinate (c1) and the third coordinate (c3a, c3b). A corresponding electronic device, a corresponding computer program product, and a corresponding computer readable medium are also disclosed.

19 Claims, 4 Drawing Sheets

(56) References Cited

U.S. PATENT DOCUMENTS

| | | | | |
|---|---|---|---|---|
| 2009/0273571 A1* | 11/2009 | Bowens | | G06F 3/03547 345/173 |
| 2010/0083111 A1* | 4/2010 | de los Reyes | | G06F 3/0482 715/702 |
| 2010/0188423 A1* | 7/2010 | Ikeda | | G06F 3/03547 345/659 |
| 2011/0012848 A1* | 1/2011 | Li | | G06F 3/0416 345/173 |
| 2011/0181527 A1* | 7/2011 | Capela | | G06F 3/04845 345/173 |
| 2011/0185317 A1* | 7/2011 | Thimbleby | | G06F 3/04883 715/863 |

FOREIGN PATENT DOCUMENTS

| | | |
|---|---|---|
| WO | 2009/084809 A1 | 7/2009 |
| WO | 2009/126710 A2 | 10/2009 |

* cited by examiner

ZOOMING METHOD

TECHNICAL FIELD

The present invention relates to a method of zooming in a graphical user interface of an electronic device having a touch screen.

BACKGROUND

Electronic devices, such as mobile phones and the like, with touch screens have gained an increased popularity in recent years. A user of the electronic device can interact with a graphical user interface of the electronic device, displayed on the touch screen of the electronic device, by performing touch operations, or touch interactions, (e.g. with a finger or other physical object) on the touch screen, such as "press down" operations, "release" operation (i.e. terminating a press-down operation), etc. One common such interaction with the graphical user interface is zooming (i.e. magnifying or scaling down image content of the graphical user interface).

Using a so called capacitive touch screen in the electronic device provides great flexibility in such user interaction, since capacitive touch screens allow detection of multiple simultaneous touch operations at different coordinates. Hence, the use of a capacitive touch screen facilitates simple user-friendly user interactions, such as zooming operations. A so called resistive touch screen, on the other hand, can only detect a single touch operation at a single coordinate at a time, which makes it more difficult to provide user-friendly means for performing user interaction, such as zooming operations. However, resistive touch screens are preferred in many applications due to their lower production cost.

SUMMARY

An object of the present invention is therefore to provide a user-friendly means for zooming in a graphical user interface of an electronic device having a touch screen that can be utilized in such electronic devices where the touch screen is a resistive touch screen. Embodiments of the invention are, however, also applicable for electronic devices having a touch screen capable of detecting multiple simultaneous touch operations at different coordinates.

According to a first aspect, there is provided a method of zooming in a graphical user interface of an electronic device having a touch screen for receiving input from a user via touch interactions. The method comprises detecting a first touch event, which is the result of a first touch interaction at a first coordinate of said touch screen. Furthermore, the method comprises detecting a second touch event, which is the result of a second touch interaction, subsequent to the first touch interaction, at a second coordinate of said touch screen. The method further comprises detecting a third touch event, which is the result of a third touch interaction, subsequent to the second touch interaction, at a third coordinate of said touch screen. Moreover, the method comprises controlling the touch screen to perform a zoom operation on an image displayed on the graphical user interface, wherein the zoom operation is representative of a first distance $L_1$ between the first coordinate and the second coordinate and a second distance $L_2$ between the first coordinate and the third coordinate.

For example, the zoom operation may be a zoom-in operation if $L_1 < L_2$ or a zoom-out operation if $L_2 < L_1$. Alternatively, the zoom operation may be a zoom-out operation if $L_1 < L_2$ or a zoom-in operation if $L_2 < L_1$.

The first touch interaction may be a first press-down operation at said first coordinate. Furthermore, the second touch interaction may be a second press down operation at said second coordinate. The first press-down operation may be terminated before the second press-down operation is performed.

The third touch interaction may include a movement to said third coordinate during said second press-down operation. Furthermore, the third touch event may include a release of the second press-down operation at said third coordinate.

Alternatively, the third touch interaction may be a third press-down operation at said third coordinate. In this case, and the second press-down operation may be terminated before the third press-down operation is performed.

Performing the zoom operation may comprise zooming with a scaling factor proportional to $L_2/L_1$.

The zoom operation may be such that image content displayed at the second coordinate before the zoom operation is displayed at a fourth coordinate after the zoom operation. The fourth coordinate may have at least one of an x component and a y component (possibly both) in an orthogonal coordinate system of said touch screen in common with the third coordinate.

The zoom operation may be such that image content displayed at the first coordinate before the zoom-operation is displayed at the first coordinate also after the zoom operation.

Alternatively, the zoom operation may be such that image content displayed at a center coordinate, located in the middle between the first coordinate and the second coordinate, before the zoom operation is displayed at said center coordinate also after the zoom operation.

In some embodiments, the zoom operation is such that an aspect ratio is preserved.

The touch screen may be a resistive touch screen.

The method may comprise inhibiting the zoom operation if the second touch interaction has not occurred within a first predefined time period starting from the detection of the first touch event. Alternatively or additionally, the method may comprise inhibiting the zoom operation if the third touch interaction has not occurred within a second predefined time period starting from the detection of the first touch event or from the detection of the second touch event.

According to a second aspect, there is provided an electronic device. The electronic device comprises a touch screen having a graphical user interface and configured to receive input from a user via touch interactions. Furthermore, the electronic device comprises a control unit operatively connected to the touch screen. The control unit is configured to detect a first touch event, which is the result of a first touch interaction at a first coordinate of said touch screen. Furthermore, the control unit is configured to detect a second touch event, which is the result of a second touch interaction, subsequent to the first touch interaction, at a second coordinate of said touch screen. The control unit is further configured to detect a third touch event, which is the result of a third touch interaction, subsequent to the second touch interaction, at a third coordinate of said touch screen. Moreover, the control unit is configured to control the touch screen to perform a zoom operation on an image displayed on the graphical user interface, wherein the zoom operation is representative of a first distance $L_1$ between the first coordinate and the second coordinate and a second distance $L_2$ between the first coordinate and the third coordinate.

The touch screen may be a resistive touch screen.

The control unit may be configured to inhibit the zoom operation if the second touch interaction has not occurred within a first predefined time period starting from the detection of the first touch event. Alternatively or additionally, the control unit may be configured to inhibit the zoom operation if the third touch interaction has not occurred within a second predefined time period starting from the detection of the first touch event or from the detection of the second touch event.

According to a third aspect, there is provided a computer program product comprising computer program code means for executing one or more of the embodiments of the method according to the first aspect when said computer program code means are run by a programmable control unit, which is operatively connected to the touch screen, of the electronic device.

According to a fourth aspect, there is provided a computer readable medium having stored thereon a computer program product comprising computer program code means for executing one or more of the embodiments of the method according to the first aspect when said computer program code means are run by a programmable control unit, which is operatively connected to the touch screen, of the electronic device.

Further embodiments of the invention are defined in the dependent claims.

It should be emphasized that the term "comprises/comprising" when used in this specification is taken to specify the presence of stated one or more features, integers, steps, or components, but does not preclude the presence or addition of one or more other features, integers, steps, components, or groups thereof

BRIEF DESCRIPTION OF THE DRAWINGS

Further objects, features and advantages of embodiments of the invention will appear from the following detailed description, reference being made to the accompanying drawings, in which.

DETAILED DESCRIPTION

Figure 1:
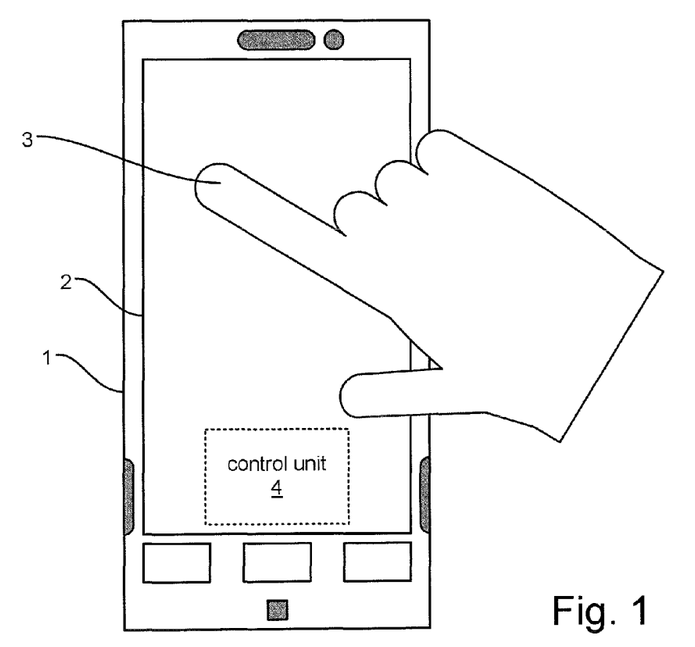
FIG. 1 schematically illustrates an electronic device having a touch screen according to an embodiment of the present invention.

FIG. 1 illustrates an electronic device 1 according to an embodiment of the present invention. The electronic device 1 may e.g. be, but is not limited to, a mobile phone, personal digital assistant, tablet device, or the like. According to the embodiment, the electronic device 1 has a touch screen 2, which allows a user to interact with a graphical user interface of the electronic device 1 by performing touch operations, or touch interactions, e.g. with his finger 3 or some other object, such as a stylus or the like. Furthermore, the electronic device comprises a control unit 4 for controlling the touch screen 2 (and possibly other parts of the electronic device 1 as well).

According to embodiments of the present invention, a method of zooming in the graphical user interface of the electronic device 1 is provided. The method may e.g. be performed, or controlled, by the control unit 4. Hence, the control unit 4 may be configured to perform the method. The method comprises detecting a first touch event, which is the result of a first touch interaction at a first coordinate of the touch screen (2). In this description, there is made a distinction between touch interactions, which is the physical interaction between a user and the touch screen 2, and touch events, which are internal events within the electronic device 1, e.g. represented by electrical signals from the touch screen 2, resulting from touch interactions, where such touch events are detectable by the control unit 4, e.g. in the form of interrupts or the like. Thus, the term "touch interaction" refers to the physical interaction between the user and the touch screen 2, whereas the term "touch event" refers to an internal event within the electronic device 1 resulting from a touch interaction, for instance in the form of an interrupt provided to the control unit 4 as a result of the touch interaction. The method further comprises detecting a second touch event, which is the result of a second touch interaction at a second coordinate of the touch screen 2. The second touch interaction is subsequent to the first touch interaction. Furthermore, the method comprises, detecting a third touch event, which is the result of a third touch interaction at a third coordinate of the touch screen 2. The third touch interaction is subsequent to the second touch interaction. Since the detection of the touch events are performed in sequential order and at a single coordinate at a time, the embodiments of the method can be used in connection with a resistive touch screen. Therefore, in accordance with some embodiments of the present invention, the touch screen 2 is a resistive touch screen (but since a capacitive touch screen is more versatile than a resistive touch screen, a capacitive touch screen may naturally be used as well in other embodiments).

The method further comprises controlling the touch screen 2 to perform a zoom operation on an image displayed on the graphical user interface. The zoom operation is representative of a first distance $L_1$ between the first coordinate and the second coordinate, and of a second distance $L_2$ between the first coordinate and the third coordinate. As a nonlimiting example, the method may comprise determining a number indicative of the first distance $L_1$ between the first coordinate and the second coordinate and determining a number indicative of the second distance $L_2$ between the first coordinate and the third coordinate. According to an example embodiment, the zoom operation is a zoom-in operation if $L_1<L_2$, or a zoom-out operation if $L_2<L_1$. In alternative (perhaps less intuitive) embodiments, it may be the other way around, i.e. that the zoom operation is a zoom-out operation if $L_1<L_2$, or a zoom-in operation if $L_2<L_1$. The zoom operation could e.g. take place continuously after the detection of the third touch event to allow the user to choose a suitable degree of zoom (in some cases referred to as "scaling factor" or "zoom factor").

Figure 2:
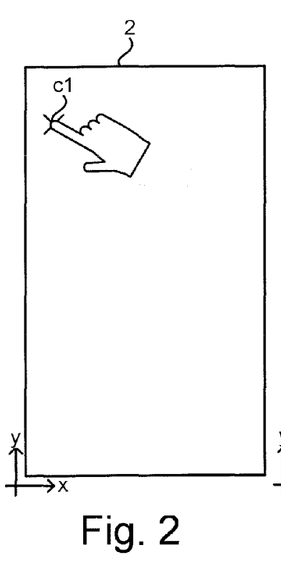
FIGS. 2-4 illustrate a series of touch events according to an embodiment of the present invention.
Figure 3:
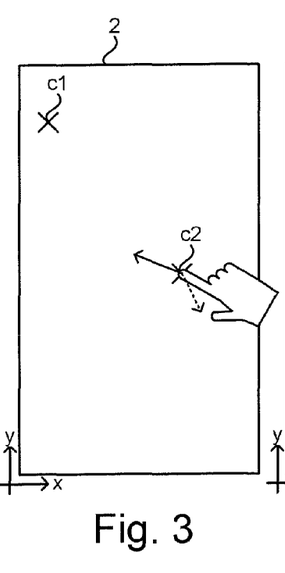
Figure 4:
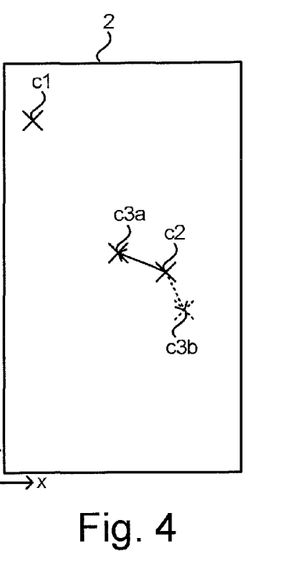

FIGS. 2-4 illustrate a series of touch interactions according to an embodiment of the present invention. In FIG. 2, the user performs a first press-down operation at the first coordinate c1. According to the embodiment, the first touch interaction is that first press-down operation, or the initiation of the first press-down operation, at said first coordinate c1. In FIG. 3, the user performs a second press-down operation at the second coordinate c2 (after termination of the first press-down operation). According to the embodiment, the second touch interaction is that second press-down operation, or the initiation of the second press-down operation, at said second coordinate c2. Thereafter, the user drags his finger (or other object) on the touch screen 2 during the second press-down operation (i.e. without releasing the pressure on the touch screen 2 after having initiated the second press-down operation). This is illustrated in FIG. 3 with two arrows illustrating two example directions in which the user may drag his finger. A solid arrow indicates a first example direction and a dotted arrow indicates a second example direction. Naturally, the user may drag his finger in any direction, and the first and second example directions are mere examples. The third touch interaction may include this movement to the third coordinate (which is denoted c3a in FIG. 4 for movement in said first example direction and c3b for movement in the second example direction) during the second press-down operation. The third touch interaction may further include a release, or termination, of the second press-down operation at the third coordinate c3a or c3b. Accordingly, the third touch interaction may comprise that the user drags his finger to the third coordinate c3a or c3b during the second press-down operation and subsequently releases the pressure at the third coordinate c3a or c3b. Alternatively, the third touch interaction may be a movement to the third coordinate c3a or c3b during said second press-down operation, i.e. that the user has dragged his finger to the third coordinate c3a or c3b during the second press-down operation but not necessarily released the pressure.

Figure 5:
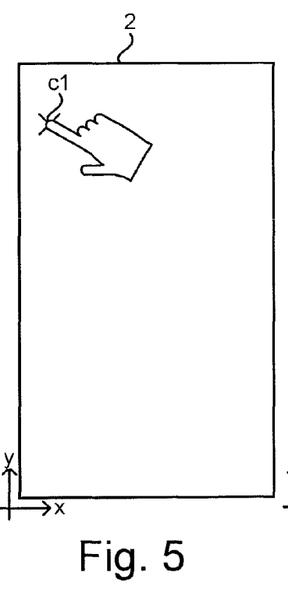
FIGS. 5-7 illustrate a series of touch events according to another embodiment of the present invention.
Figure 6:
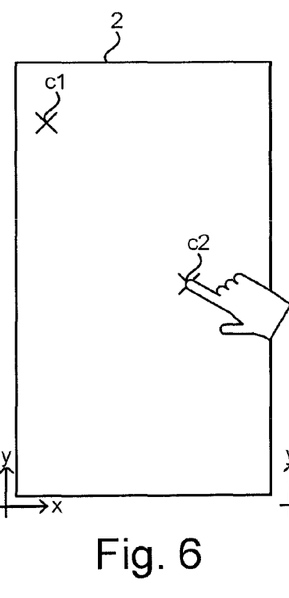
Figure 7:
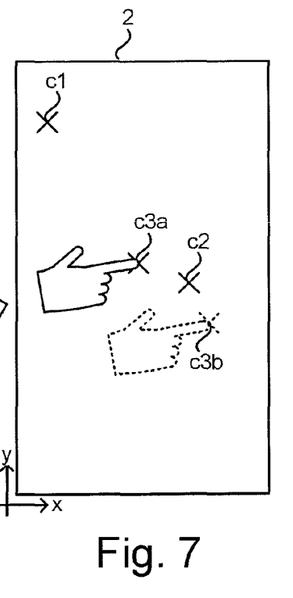

FIGS. 5-7 illustrate a series of touch interactions according to another embodiment of the present invention. In FIG. 5, the user performs a first press-down operation at the first coordinate c1. According to the embodiment, the first touch interaction is that first press-down operation, or the initiation of the first press-down operation, at said first coordinate c1. In FIG. 6, the user performs a second press-down operation at the second coordinate c2 (after termination of the first press-down operation). According to the embodiment, the second touch event is that second press down operation, or the initiation of the second press-down operation, at said second coordinate c2. So far, this embodiment corresponds to the embodiment described above with reference to FIGS. 2-4. However, from this point, this embodiment deviates from the former embodiment. As illustrated in FIG. 7, the user subsequently performs a third press-down operation at the third coordinate. According to the embodiment, the third touch interaction is the third press-down operation, or the initiation of the third press-down operation, at said third coordinate (after termination of the second press-down operation). Two examples of the third coordinate are illustrated in FIG. 7, denoted c3a and c3b respectively (same examples as the example coordinates c3a and c3b in FIG. 4).

Figure 8:
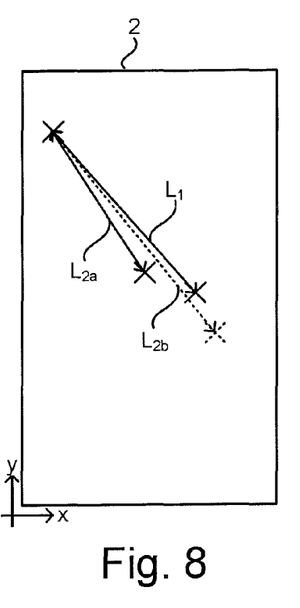
FIG. 8 illustrates distances between coordinates according to examples.

FIG. 8 illustrates the distances $L_1$ and $L_2$ mentioned above for the two different examples of the third coordinate (c3a and c3b) considered in FIGS. 4 and 7. For the example where the third coordinate is c3a, the distance $L_2=L_{2a}<L_1$, whereby the zoom operation to be performed is a zoom-out operation according to the example embodiment mentioned above. For the example where the third coordinate is c3b, the distance $L_2=L_{2b}>L_1$, whereby the zoom operation to be performed is a zoom-in operation according to the example embodiment mentioned above. In the examples illustrated in FIG. 8, the distances $L_1$ and $L_2$ corresponds to the length of a straight line between the first coordinate and the second coordinate and between the first coordinate and the third coordinate, respectively. In other embodiments, the distances $L_1$ and $L_2$ may be the distances in the x direction or in the y direction only between the first coordinate and the second coordinate and between the first coordinate and the third coordinate, respectively.

Different alternatives are possible for the actual zoom operation. For example, performing the zoom operation may comprise zooming with a scaling factor proportional to $L_2/L_1$.

Furthermore, the zoom operation may be such that an aspect ratio of the image content subject to the zooming is preserved.

Furthermore, the zoom operation may be such that image content displayed at the second coordinate c2 before the zoom operation is displayed at a fourth coordinate (not shown) after the zoom operation, where the fourth coordinate has at least one of an x component and a y component (possibly both) in an orthogonal coordinate system (such as the x/y-coordinate system indicated in FIGS. 2-8) of the touch screen 2 in common with the third coordinate (such as c3a or c3b). That is, the second coordinate c2 may define a corner of a zoom box before the zoom operation, and the fourth coordinate may define a corresponding corner of a corresponding zoom box after the zoom operation. In case the fourth coordinate only has one of said x and y components in common with the third coordinate, the other (x or y) component of the fourth coordinate may be determined based on the condition that the aspect ratio should be preserved.

Different alternatives may also be used for which coordinate should be "fixed" during the zoom operation. For example, the zoom operation may be such that the first coordinate c1 is fixed, i.e. such that image content displayed at (or close to) the first coordinate c1 before the zoom-operation is displayed at (or close to) the first coordinate c1 also after the zoom operation. Alternatively, the zoom operation may be such that a center coordinate (not shown) located in the middle between the first coordinate c1 and the second coordinate c2 is fixed, i.e. such that image content displayed at (or close to) the center coordinate before the zoom operation is displayed at (or close to) the center coordinate also after the zoom operation. Other alternatives are possible as well.

According to some embodiments, the zoom operation may be inhibited, or aborted, if the user operates too slowly (which could indicate e.g. that the user has initiated the zooming method unintentionally, or has changed his mind after initiating the zooming method). For example, the zoom operation may be inhibited if the second touch interaction has not occurred within a first predefined time period starting from the detection of the first touch event. Alternatively or additionally, the zoom operation may be inhibited if the third touch interaction has not occurred within a second predefined time period, which may start e.g. from the detection of the first touch event or from the detection of the second touch event.

Figure 9:
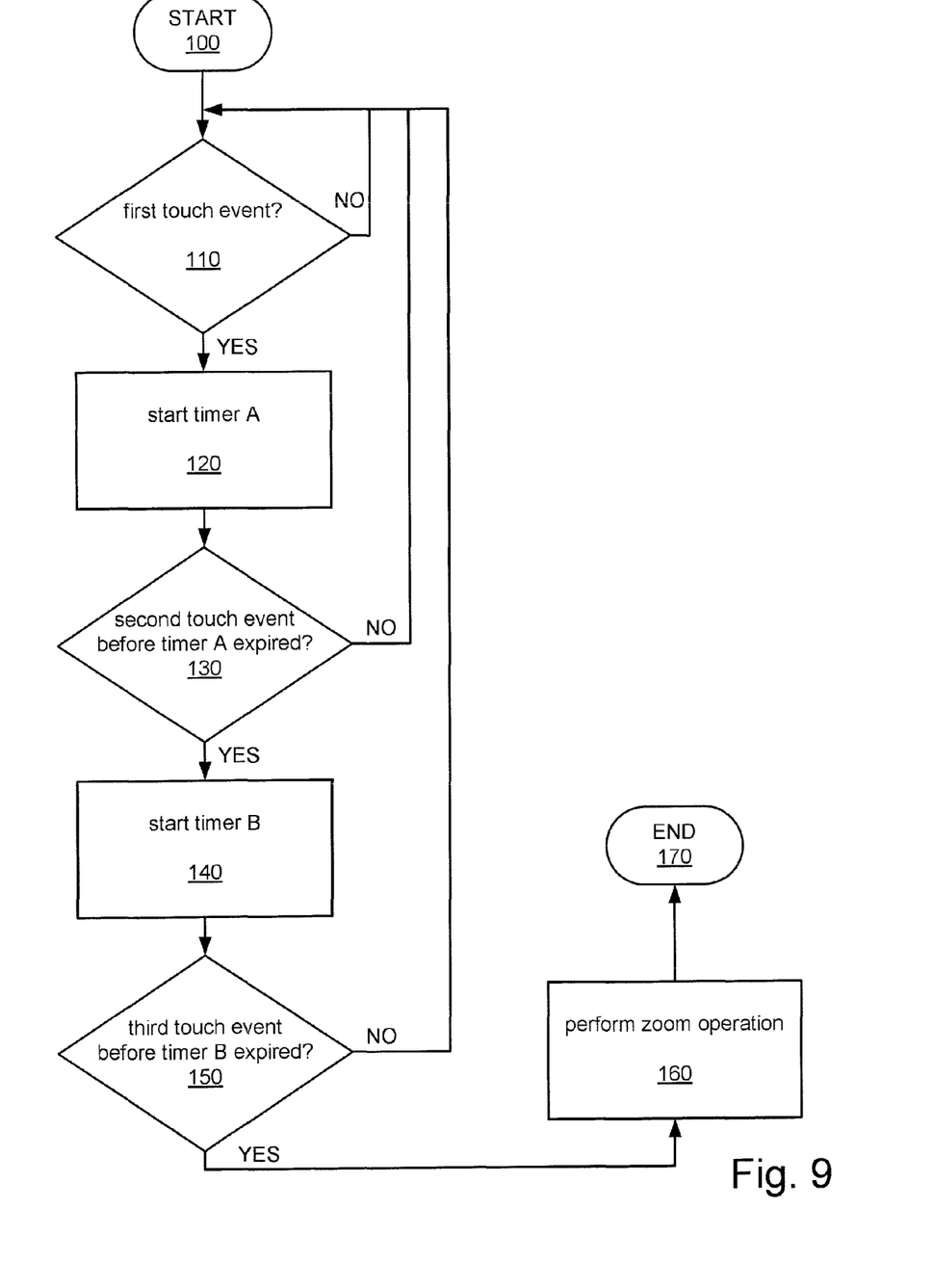
FIG. 9 is a flowchart of a method according to an embodiment of the present invention.

FIG. 9 is a flowchart of an embodiment of the method. The operation is started in step 100. In step 110, it is checked whether the first touch event has been detected. If not, the operation loops back to step 110 again checking whether the first touch event has been detected. Hence, according to this embodiment, the operation effectively stays in step 110 until the first touch event has been detected. When the first touch event has been detected, the operation proceeds to step 120. In step 120, a first timer, denoted timer A, is started. According to this embodiment, the above-mentioned first predefined time period expires when timer A expires. Hence, timer A is utilized to measure the first predefined time period.

In step 130, it is checked whether the second touch event has been detected before timer A has expired, i.e. if the second touch event has been detected within the first predefined time period. If not, the operation is "aborted" and returns to step 110, again waiting for the detection of a new first touch event. If, on the other hand, the second touch event is indeed detected within the first predefined time period, the operation proceeds to step 140. In step 140, a second timer, denoted timer B, is started. The above-mentioned second predefined time period expires when timer B expires. Hence, timer B is utilized to measure the second predefined time period. Consequently, the embodiment illustrated in FIG. 9 corresponds to the case when the second predefined time period starts from the detection of the second touch event. In an alternative embodiment (not shown), timer B may be started in step 120 instead, which would correspond to the case when the second predefined time period starts from the detection of the first touch event.

In step 150, it is checked whether the third touch event has been detected before timer B has expired, i.e. if the third touch event has been detected within the second predefined time period. If not, the operation is "aborted" and returns to step 110, again waiting for the detection of a new first touch event. If, on the other hand, the third touch event is indeed detected within the second predefined time period, the operation proceeds to step 160. In step 160, the zoom operation is performed based on the first, second, and third coordinates as outlined above in the context of various embodiments. This step may include that the image content is zoomed in or out accordance with the zoom operation, and the zoomed image content or a part of it (part which fits within the graphical user interface) is sent to the graphical user interface where it is displayed. Thereafter, the operation is ended in step 170. Alternatively, the operation may return from step 160 to step 110 waiting for a further zooming to be initiated.

The use of the first and second timer, timer A and timer B, mentioned above is merely an example. Any suitable time-out mechanism may be used to determine whether the user operates too slowly, e.g. to determine whether or not the second touch interaction has occurred within the first predefined time period and/or to determine whether or not the third touch interaction has occurred within the second predefined time period.

Figure 10:
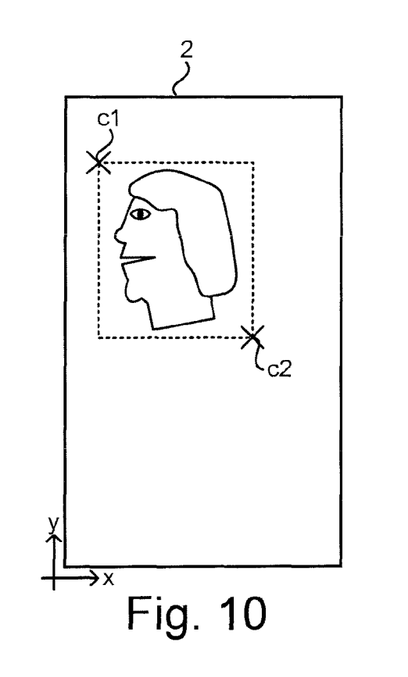
FIGS. 10-11 illustrate a zoom-out operation according to an example.
Figure 11:
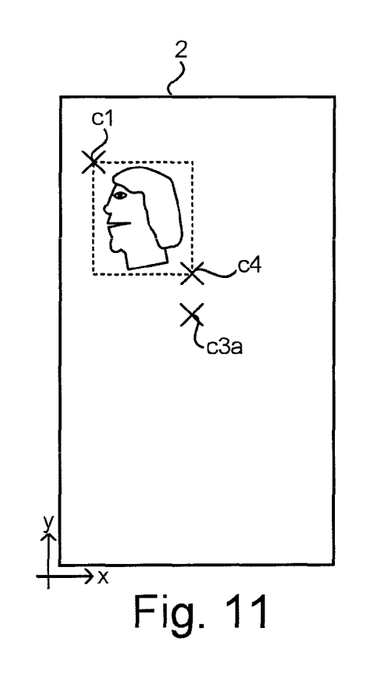

FIGS. 10-11 illustrate a zoom-out operation according to an example. FIG. 10 illustrates the content of the graphical user interface before the zoom-out operation, whereas FIG. 11 illustrates the content of the graphical user interface after the zoom-out operation. The example utilizes the coordinates c1, c2, and c3a considered in FIGS. 2-8 as the first, second, and third coordinate, respectively. Furthermore, in this example, the first coordinate c1 is fixed such that image content displayed at the first coordinate c1 before the zoom-operation is displayed at the first coordinate cl also after the zoom operation. Moreover, according to this example, the aspect ratio of the image data is fixed. Image content displayed at the second coordinate c2 before the zoom operation is displayed at a fourth coordinate (denoted c4 in FIG. 11) after the zoom operation. In the example shown, the fourth coordinate has the x component in common with the third coordinate c3a, whereas the y component of c4 is determined to preserve the aspect ratio of the image content.

As mentioned above, the control unit 4 may be configured to perform the one or more of the embodiments of the method described above. Accordingly, the control unit 4 may be configured to perform one or more of the steps of any of the embodiments of the method described above. For example, the control unit 4 may be configured to detect said first touch event, which is the result of said first touch interaction at said first coordinate of said touch screen 2. Furthermore, the control unit 4 may be configured to detect said second touch event, which is the result of said second touch interaction, subsequent to the first touch interaction, at said second coordinate of said touch screen 2. Moreover, the control unit 4 may be configured to detect said third touch event, which is the result of said third touch interaction, subsequent to the second touch interaction, at said third coordinate of said touch screen 2. Also, the control unit 4 may be adapted to control the touch screen 2 to perform said zoom operation on an image displayed on the graphical user interface, wherein the zoom operation is representative of said first distance $L_1$ and said second distance $L_2$.

Figure 12:
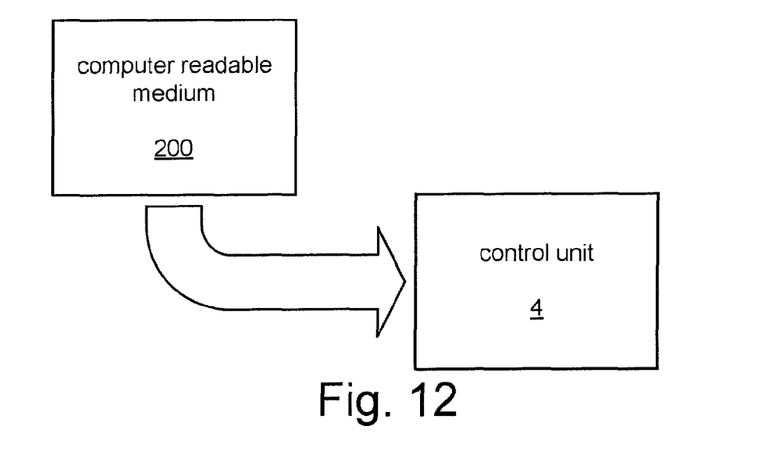
FIG. 12 schematically illustrates a computer-readable medium and a programmable control unit according to an embodiment of the present invention.

The control unit 4 (FIG. 1) may be implemented as an application-specific hardware unit. Alternatively, said control unit 4 or parts thereof may be implemented using one or more configurable or programmable hardware units, such as but not limited to one or more field-programmable gate arrays (FPGAs), processors, or microcontrollers. Thus, the control unit 4 may be a programmable control unit 4. Hence, embodiments of the present invention may be embedded in a computer program product, which enables implementation of the method and functions described herein. Therefore, according to embodiments of the present invention, there is provided a computer program product, comprising instructions arranged to cause the programmable control unit 4 to perform the steps of any of the embodiments of the method described herein. The computer program product may comprise program code which is stored on a computer readable medium 200, as illustrated in FIG. 12, which can be loaded and executed by the programmable control unit 4, to cause it to perform the steps of any of the embodiments of the method described herein.

The present invention has been described above with reference to specific embodiments. However, other embodiments than the above described are possible within the scope of the invention. Different method steps than those described above, performing the method by hardware or software, may be provided within the scope of the invention. The different features and steps of the embodiments may be combined in other combinations than those described. The scope of the invention is only limited by the appended patent claims.

The invention claimed is:

1. A method of zooming in a graphical user interface of an electronic device having a touch screen for receiving input from a user via touch interactions, wherein the method comprises:
    detecting a first touch event, which is the result of a first touch interaction at a first coordinate of said touch screen, wherein the first touch interaction is a first press-down operation at said first coordinate;
    detecting a second touch event, which is the result of a second touch interaction, subsequent to the first touch interaction, at a second coordinate of said touch screen, wherein the second touch interaction is a second press-down operation at said second coordinate and the first press-down operation is terminated before the second press-down operation is performed;
    detecting a third touch event, which is the result of a third touch interaction, subsequent to the second touch interaction, at a third coordinate of said touch screen, wherein the third touch interaction is a third press-down operation at said third coordinate, and the second press-down operation is terminated before the third press-down operation is performed; and
    controlling the touch screen to perform a zoom operation on an image displayed on the graphical user interface, wherein the zoom operation is representative of a first distance $L_1$ between the first coordinate and the second coordinate and a second distance $L_2$ between the first coordinate and the third coordinate.

2. The method according to claim 1, wherein the zoom operation is:
    a zoom-in operation if $L_1 < L_2$; or
    a zoom-out operation if $L_2 < L_1$.

3. The method according to claim 1, wherein performing the zoom operation comprises zooming with a scaling factor proportional to $L_2/L_1$.

4. The method according to claim 1, wherein the zoom operation is such that image content displayed at the second coordinate before the zoom operation is displayed at a fourth coordinate after the zoom operation, wherein the fourth coordinate has at least one of an x component and a y component in an orthogonal coordinate system of said touch screen in common with the third coordinate.

5. The method according to claim 1, wherein the zoom operation is such that image content displayed at the first coordinate before the zoom-operation is displayed at the first coordinate also after the zoom operation.

6. The method according to claim 1, wherein the zoom operation is such that image content displayed at a center coordinate, located in the middle between the first coordinate and the second coordinate, before the zoom operation is displayed at said center coordinate also after the zoom operation.

7. The method according to claim 1, wherein the zoom operation is such that an aspect ratio is preserved.

8. The method according to claim 1, wherein the touch screen is a resistive touch screen.

9. The method according to claim 1, wherein the zoom operation is:
a zoom-out operation if $L_1<L_2$; or
a zoom-in operation if $L_2<L_1$.

10. The method according to claim 1, comprising inhibiting the zoom operation if:
the second touch interaction has not occurred within a first predefined time period starting from the detection of the first touch event; or
the third touch interaction has not occurred within a second predefined time period starting from the detection of the first touch event or from the detection of the second touch event.

11. An electronic device comprising:
a touch screen having a graphical user interface and configured to receive input from a user via touch interactions; and
a control unit connected to the touch screen and configured to:
detect a first touch event, which is the result of a first touch interaction at a first coordinate of said touch screen, wherein the first touch interaction is a first press-down operation at said first coordinate;
detect a second touch event, which is the result of a second touch interaction, subsequent to the first touch interaction, at a second coordinate of said touch screen, wherein the second touch interaction is a second press-down operation at said second coordinate and the first press-down operation is terminated before the second press-down operation is performed;
detect a third touch event, which is the result of a third touch interaction, subsequent to the second touch interaction, at a third coordinate of said touch screen, wherein the third touch interaction is a third press-down operation at said third coordinate, and the second press-down operation is terminated before the third press-down operation is performed; and
control the touch screen to perform a zoom operation on an image displayed on the graphical user interface, wherein the zoom operation is representative of a first distance $L_1$ between the first coordinate and the second coordinate and a second distance $L_2$ between the first coordinate and the third coordinate.

12. The electronic device according to claim 11, wherein the touch screen is a resistive touch screen.

13. The electronic device according to claim 11, wherein the control unit is configured to inhibit the zoom operation if the second touch interaction has not occurred within a first predefined time period starting from the detection of the first touch event.

14. The electronic device according to claim 11, wherein the control unit is configured to inhibit the zoom operation if the third touch interaction has not occurred within a second predefined time period starting from the detection of the first touch event or from the detection of the second touch event.

15. A non-transitory computer readable medium having stored thereon a computer program product comprising computer program code, which when executed by a programmable control unit connected to a touch screen of an electronic device causes the programmable control unit to:
detect a first touch event, which is the result of a first touch interaction at a first coordinate of said touch screen, wherein the first touch interaction is a first press-down operation at said first coordinate;
detect a second touch event, which is the result of a second touch interaction, subsequent to the first touch interaction, at a second coordinate of said touch screen, wherein the second touch interaction is a second-press down operation at said second coordinate and the first press-down operation is terminated before the second press-down operation is performed;
detect a third touch event, which is the result of a third touch interaction, subsequent to the second touch interaction, at a third coordinate of said touch screen, wherein the third touch interaction is a third press-down operation at said third coordinate, and the second press-down operation is terminated before the third press-down operation is performed; and
control the touch screen to perform a zoom operation on an image displayed on the graphical user interface, wherein the zoom operation is representative of a first distance $L_1$ between the first coordinate and the second coordinate and a second distance $L_2$ between the first coordinate and the third coordinate.

16. The non-transitory computer readable medium according to claim 15, wherein the zoom operation is:
a zoom-in operation if $L_1<L_2$; or
a zoom-out operation if $L_2<L_1$.

17. The non-transitory computer readable medium according to claim 15, wherein performing the zoom operation comprises zooming with a scaling factor proportional to $L_2/L_1$.

18. The non-transitory computer readable medium according to claim 15, wherein the zoom operation is such that image content displayed at the second coordinate before the zoom operation is displayed at a fourth coordinate after the zoom operation, wherein the fourth coordinate has at least one of an x component and a y component in an orthogonal coordinate system of said touch screen in common with the third coordinate.

19. The non-transitory computer readable medium according to claim 15, wherein the touch screen is a resistive touch screen.

* * * * *